(12) United States Patent
Benzel et al.

(10) Patent No.: US 8,250,925 B2
(45) Date of Patent: Aug. 28, 2012

(54) WORKPIECE COMPOSITE HAVING A PREFORM AND A GEL

(75) Inventors: Hubert Benzel, Pliezhausen (DE); Lutz Mueller, Aichtal (DE); Roman Sellin, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 428 days.

(21) Appl. No.: 12/584,451

(22) Filed: Sep. 3, 2009

(65) Prior Publication Data
US 2010/0077862 A1    Apr. 1, 2010

(30) Foreign Application Priority Data

Sep. 30, 2008   (DE) .................. 10 2008 042 489

(51) Int. Cl.
G01L 7/08    (2006.01)
(52) U.S. Cl. .................. 73/715; 73/723; 361/283.4
(58) Field of Classification Search .................. None
See application file for complete search history.

(56) References Cited

U.S. PATENT DOCUMENTS

| | | | | |
|---|---|---|---|---|
| 5,852,244 A * | 12/1998 | Englund et al. | ................. | 73/706 |
| 5,869,766 A * | 2/1999 | Cucci et al. | .................... | 73/706 |
| 6,263,739 B1 * | 7/2001 | Seefried et al. | ................. | 73/715 |
| 6,425,294 B1 * | 7/2002 | Shiono et al. | ................. | 73/756 |
| 7,287,433 B2 * | 10/2007 | Tanaka | ............................ | 73/727 |
| 7,900,521 B2 * | 3/2011 | Hooper et al. | .................. | 73/756 |

FOREIGN PATENT DOCUMENTS

| | | |
|---|---|---|
| DE | 196 49 955 | 6/1998 |
| DE | 198 47 303 | 5/2000 |
| DE | 10 2005056760 | 6/2007 |
| WO | WO 2007/062976 | 6/2007 |

* cited by examiner

*Primary Examiner* — Lisa Caputo
*Assistant Examiner* — Jermaine Jenkins
(74) *Attorney, Agent, or Firm* — Kenyon & Kenyon LLP

(57) ABSTRACT

A workpiece composite includes a preform part and a gel accommodated in a recess in the preform, the recess being enclosed by at least one edge which serves as a creep barrier to prevent the gel from spreading. The at least one edge of the recess defines a termination point of at least one surface which is provided with a coating made of an oleophobic material in an area adjacent to the at least one edge.

16 Claims, 2 Drawing Sheets

WORKPIECE COMPOSITE HAVING A PREFORM AND A GEL

BACKGROUND OF THE INVENTION

1. Field of the Invention

The present invention relates to a workpiece composite including a preform and a gel.

2. Description of Related Art

Workpiece composites containing a preform and a gel, which is accommodated in a recess of the preform, are used as pressure sensors, for example. The preform may contain a pressed screen of a printed circuit board, for example, and may be connected to a pressure sensor chip. The pressure sensor chip is positioned over a recess in the preform. The gel fills the recess and the area underneath the diaphragm of the pressure measuring chip. In general, the pressure measuring chip is bonded to the preform with the aid of an accessory agent.

Normally the gel is a passivating gel which is used as a barrier against harmful media. These are, for example, corrosive media.

However, unhardened passivating gels usually tend to creep. It is necessary to select the time period between the application of the gel and hardening to be as short as possible in order to limit areas affected by creeping to a minimum. Another option for preventing creeping is the formation of edges at which creeping stops. However, these edges may stop creeping only temporarily.

In order to prevent oils from creeping on surfaces, i.e., to prevent a surface from being wetted by an oil, it is known, for example, from published German patent document DE A 196 49 955, to coat a substrate with a fluoroalkyl-functional organopolysiloxane-containing composition. Coatings of this type are offered commercially, for example, by the Dr. Tillwich Company. Published German patent document DE A 198 47 303 describes a sensor element having an antiadhesive surface coating. The surface coating has a compound selected from the group of the fluoropolymers, fluorormocers, polymeric fluorocarbon resins, fluorine-containing silanes, or partially fluorinated polymers.

BRIEF SUMMARY OF THE INVENTION

A workpiece composite according to the present invention contains a preform and a gel which is accommodated in a recess of the preform. The recess is enclosed by at least one edge as a creep barrier to prevent the gel from spreading. At least the edge and/or a surface surrounding the recess between the recess and the edge is provided with a coating made of an oleophobic material.

Surprisingly, it has been found that a surface which is provided with a coating made of oleophobic material also prevents the gel from creeping on this surface. The gel may thus be further prevented from creeping by the workpiece composite designed according to the present invention.

Another improvement results from providing the surfaces adjacent to the edge with the coating made of the oleophobic material.

The oleophobic material of the coating is preferably selected from the group composed of fluoropolymers, fluorormocers, polymeric fluorocarbon resins, fluorine-containing silanes, and partially fluorinated polymers. Suitable materials contained in the coating include, for example, silanes of the general formula (1)

$$R^a\text{---}R^b\text{---}Si(X)_{3-n}(R^c)_n \quad (1)$$

where $R^a$ is a perfluorinated alkyl group having 1 to 16 C atoms, preferably 6 to 12 C atoms, $R^b$ is an alkyl spacer, for example, methyl or ethyl, and $R^c$ is an alkyl group, for example, methyl or ethyl. X is a halogen, an acetoxy or an alkoxy, for example, ethoxy or methoxy, and n has the value of 0 to 2.

Silanes of the general formulas $R^a\text{---}R^b\text{---}SiX_3$, $R^a\text{---}R^b\text{---}Si(X)_2Me$ or $R^a\text{---}R^b\text{---}Si(X)Me_2$ and their derivatives are particularly suitable, X denoting fluorine, chlorine, bromine, methoxy, ethoxy, isopropoxy, alkoxy, or acetoxy, Me denoting methyl, and $Me_2$ dimethyl. $R^a$ denotes perfluoro-butyl, perfluoro-hexyl, perfluoro-octyl, perfluoro-decyl, perfluoromethyl, and $R^b$ denotes ethyl or methyl. More preferably, $R^a\text{---}R^b\text{---}$ denotes 1,1,2,2-tetrahydroperfluorooctyl- or 3,3,3-trifluoropropyl.

Silanes of the general formula $(R^a\text{---}R^b)_2\text{---}SiX_2$ and their derivatives are also suitable, X here also denoting fluorine, chlorine, bromine, methoxy, ethoxy, isopropoxy, alkoxy, or acetoxy, $R^a$ denoting perfluoroethyl, perfluorobutyl, perfluoromethyl, and $R^a$ denoting ethyl or methyl. A suitable $R^a\text{---}R^b$ radical is, for example, 3,3,3-trifluoropropyl Suitable silanes include, for example, 1,1,2,2-tetrahydroperfluorodecyltriethoxysilane, 1,1,2,2-perfluorotetrahydrododecyltrichlorosilane, 1,1,2,2-perfluorotetrahydrododecyltrimethoxysilanes, 1,1,2,2-tetrahydroperfluorodecyltrichlorosilane, 1,1,2,2-tetrahydroperfluorodecyltrimethoxysilane, 1,1,2,2-tetrahydroperfluorodecyltriacetoxysilane, 1,1,2,2-tetrahydroperfluorodecyltriethoxysilane, 1,1,2,2-tetrahydroperfluorooctyltrichlorosilane, 1,1,2,2-tetrahydroperfluorooctyltrimethoxysilane, 1,1,2,2-tetrahydroperfluorooctyltriethoxysilane, 1,1,2,2-perfluorotetrahydrohexyltrichlorosilane, 1,1,2,2-perfluorotetrahydrohexyltriethoxysilane, 1,1,2,2-perfluorotetra-hydrohexyltrimethoxysilane, di(3,3,3-trifluoropropyl)dichlorosilane, 3,3,3-trifluoropropyltriacetoxysilane, 3,3,3-trifluoropropyltribromsilane, 3,3,3-trifluoropropyltrichlorosilane, 3,3,3-trifluoropropyltriethoxysilane, 3,3,3-trifluoropropyltrifluorosilane, 3,3,3-trifluoropropyltriisopropoxysilane, 3,3,3-trifluoropropyltrimethoxysilane, di(pentafluorophenyl)diacetoxysilane, di(pentafluorophenyl)dibromosilane, di(pentafluorophenyl)dichlorosilane, di(pentafluorophenyl)-diethoxysilane, di(pentafluorophenyl)difluorosilane, di(pentafluorophenyl)diisopropoxysilane, di(pentafluorophenyl)dimethoxysilane, perfluorodecyl-1H,1H,2H,2H-dimethylchlorosilane, perfluorodecyl-1H,1H,2H,2H-methyldichlorosilane, perfluorodecyl-1H,1H,2H,2H-triacetoxysilane, perfluorodecyl-1H,1H,2H,2H-trichlorosilane, perfluorodecyl-1H,1H,2H,2H-triethoxysilane, perfluorodecyl-1H,1H,2H,2H-trimethoxysilane, perfluorododecyl-1H,1H,2H,2H-dimethylchlorosilane, perfluorododecyl-1H,1H,2H,2H-methyldichlorosilane, perfluorododecyl-1H,1H,2H,2H-trichlorosilane, perfluorododecyl-1H,1H,2H,2H-triethoxysilane, perfluorododecyl-1H,1H,2H,2H-trimethoxysilane, perfluorohexyl-1H,1H,2H,2H-dimethylchlorosilane, perfluorohexyl-1H,1H,2H,2H-methyldichlorosilane, perfluorohexyl-1H,1H,2H,2H-trichlorosilane, perfluorohexyl-1H,1H,2H,2H-triethoxysilane, perfluorohexyl-1H,1H,2H,2H-trimethoxysilane, perfluorooctyl-1H,1H,2H,2H-dimethylchlorosilane, perfluorooctyl-1H,1H,2H,2H-methyldichlorosilane, perfluorooctyl-1H,1H,2H,2H-triacetoxysilane, perfluorooctyl-1H,1H,2H,2H-trichlorosilane, perfluorooctyl-1H,1H,2H,2H- triethoxysilane, perfluorooctyl-1H,1H,2H,2H-trimethoxysilane, perfluorodecyl-1H,1H-dimethylchlorosilane, perfluorodecyl-1H,1H-methyldichlorosilane, perfluorodecyl-1H,1H-triacetoxysilane, perfluorodecyl-1H,1H-trichlorosilane, perfluorodecyl-1H,1H-triethoxysilane, perfluorodecyl-1H,1H-trimethoxysilane, perfluorododecyl-1H,1H-dimethylchlorosilane, perfluorododecyl-1H,1H-methyldichlorosilane, perfluorododecyl-1H,1H-trichlorosilane, perfluorododecyl-1H,1H-triethoxysilane, perfluorododecyl-1H,1H-trimethoxysilane, perfluorohexyl-1H,1H-dimethylchlorosilane, perfluorohexyl-1H,1H-methyldichlorosilane, perfluorohexyl-1H,1H-trichlorosilane, perfluorohexyl-1H,1H-triethoxysilane, perfluorohexyl-1H,1H-trimethoxysilane, perfluorooctyl-1H,1H-dimethylchlorosilane, perfluorooctyl-1H,1H-methyldichlorosilane, perfluorooctyl-1H,1H-triacetoxysilane, perfluorooctyl-1H,1H-trichlorosilane, perfluorooctyl-1H,1H-triethoxysilane, perfluorooctyl-1H,1H-trimethoxysilane, perfluorodecyl-1H,1H,2H,2H,3H,3H-dimethylchlorosilane, perfluorodecyl-1H,1H,2H,2H,3H,3H-methyldichlorosilane, perfluorodecyl-1H,1H,2H,2H,3H,3H-triacetoxysilane, perfluorodecyl-1H,1H,2H,2H,3H,3H-trichlorosilane, perfluorodecyl-1H,1H,2H,2H,3H,3H-triethoxysilane, perfluorodecyl-1H,1H,2H,2H,3H,3H-trimethoxysilane, perfluorododecyl-1H,1H,2H,2H,3H,3H-dimethylchlorosilane, perfluorododecyl-1H,1H,2H,2H,3H,3H-methyldichlorosilane, perfluorododecyl-1H,1H,2H,2H,3H,3H-trichlorosilane, perfluorododecyl-1H,1H,2H,2H,3H,3H-triethoxysilane, perfluorododecyl-1H,1H,2H,2H,3H,3H-trimethoxysilane, perfluorohexyl-1H,1H,2H,2H,3H,3H-dimethylchlorosilane, perfluorohexyl-1H,1H,2H,2H,3H,3H-methyldichlorosilane, perfluorohexyl-1H,1H,2H,2H,3H,3H-trichlorosilane, perfluorohexyl-1H,1H,2H,2H,3H,3H-triethoxysilane, perfluorohexyl-1H,1H,2H,2H,3H,3H-trimethoxysilane, perfluorooctyl-1H,1H,2H,2H,3H,3H-dimethylchlorosilane, perfluorooctyl-1H,1H,2H,2H,3H,3H-methyldichlorosilane, perfluorooctyl-1H,1H,2H,2H,3H,3H-triacetoxysilane, perfluorooctyl-1H,1H,2H,2H,3H,3H-trichlorosilane, perfluorooctyl-1H,1H,2H,2H,3H,3H-triethoxysilane, perfluorooctyl-1H,1H,2H,2H,3H,3H-trimethoxysilane.

Particularly suitable are 1,1,2,2-perfluorotetrahydrododecyltrichlorosilane, 1,1,2,2-perfluorotetrahydrododecyltrimethoxysilane, 1,1,2,2-tetrahydroperfluorodecyl-trichlorosilane, 1,1,2,2-tetrahydroperfluorodecyltrimethoxysilane, 1,1,2,2-tetrahydroperfluorodecyltriacetoxysilane, 1,1,2,2-tetrahydroperfluorodecyltriethoxysilane, 1,1,2,2-tetrahydroperfluorooctyltrichlorosilane, 1,1,2,2-tetrahydroperfluorooctyltrimethoxysilane, 1,1,2,2-tetrahydroperfluorooctyltriethoxysilane, 1,1,2,2-perfluorotetrahydrohexyltrichlorosilane, 1,1,2,2-perfluorotetrahydrohexyltriethoxysilane, 1,1,2,2-perfluorotetrahydrohexyltrimethoxysilane.

Furthermore, perfluorodecyl carboxylic acid (PFDA) and perfluorinated plasma polymers are suitable for the coating material.

The physical and/or chemical bonding of the coating to the material of the preform may be improved by an activating pre-treatment. Oxygen plasma, ozone, steam plasma, or hard UV light at wavelengths <220 nm, for example, is suitable for the activating pre-treatment.

For applying the coating, the coating material may furthermore contain at least one solvent in which the oleophobic material is dissolved or dispersed. Additives such as antifoam and fluidizing agents may also be added.

A suitable solution for applying the coating contains, for example, 0.1% to 5% 1,1,2,2-tetrahydroperfluorooctyltrimethoxysilane, 0.5% to 5% water, 0.1% acetic acid, the balance isopropanol. The solution is prepared and homogenized overnight with stirring. The solution is applied at the desired locations and, after drying at 110° C. for 30 minutes, baked in a circulating air oven.

Many of the above-mentioned silanes are utilizable directly as a solution in hydrocarbons or alcohols without any further additives for the coating. Chlorosilanes are preferably used for the gas phase deposition. In addition to solutions of the pure silanes, these silanes are also suitable for coating in a partially hydrolyzed form or in mixtures with polymers or mixtures of the individual silanes.

The coating, which is applied to the edge and/or the surface surrounding the recess between the recess and the edge, preferably has a layer thickness in the range of 1 nm to 20 µm; especially preferably the layer thickness of the coating is in the range of 1 nm to 1 µm.

In another specific embodiment, at least two edges of the preform have a stepped design as creep barriers. The two stepped edges further slow down creeping. In particular, even in the case of long dwelling times, for example, between application and hardening of the gel, creeping on the preform surface may be suppressed. Another improvement results if at least each edge is provided with the oleophobic coating.

The oleophobic layer may be applied to the preform, for example, as a paint layer or as an epilame layer. The coating may be applied, for example, by pad printing, stamping, dripping, dispensing, immersing, or spraying, as well as by CVD (Chemical Vapor Deposition) methods or PVD (Physical Vapor Deposition) methods. In the pad printing, stamping, dripping, dispensing, immersing, or spraying methods, the coating is applied using a liquid coating material; in the CVD or PVD method, the coating is applied from the gaseous phase.

After applying the coating, the surfaces that are not provided with the coating may be structured.

The coating may be applied from a solution or from the gaseous phase. Local application by stamping, spraying, dispensing, etc., is possible from a solution. From the gaseous phase, the entire component is coated; local removal of the coating is possible by applying perforated sheet metal masks and 50 Hz to 40 kHz oxygen plasma or steam plasma, by applying quartz glass masks and UV light, as well as without masking with the help of a laser.

Since, in general, components are glued to the preform, to which gel is also to adhere, preforms coated on their entire surface have the coating preferably removed again with the exception of the gel stop edges.

In a particularly preferred specific embodiment of the present invention, the recess, which is enclosed by at least one edge as a creep barrier, is sealed using a diaphragm. The diaphragm which seals the recess is preferably part of a pressure sensor chip.

The preform is preferably made of a thermoplast or duroplast, usually of LCP, PEEK, or epoxy resin. Other suitable materials for the preform are, however, also ceramics and metals.

The gel preferably contains silicones, partially fluorinated silicones, or perfluoropolyethers. The gel preferably furthermore contains substances for neutralizing corrosive or poisonous media, for example, anti-corrosion additives.

In particular when using the workpiece composite as a pressure sensor, the embodiment according to the present invention and the associated increased effectiveness of the creep barrier yield the advantage that the risk of leaks on the boundary surface between the adhesive using which the pressure sensor chip is applied to the preform and the preform is reduced. In addition, the mechanical adhesive strength of the workpiece composite in a plug housing in which it is mounted is improved.

The gel is held in position by the improved creep barrier. Minor leaks, for example, are prevented by the gel. These leaks, in particular on the adhesive of the pressure sensor chip on the preform, may result in a pressure exchange between the front and back sides of the diaphragm. This prevents the differential pressure from being correctly measured. The measuring accuracy may thus be improved by using the workpiece composite according to the present invention.

Manufacturability is also enhanced by the workpiece composite according to the present invention. Contamination from handling and manufacturing devices, for example, may thus be prevented. A more reliable protection, which is almost unlimited in time, against gel overflow by creeping also results in this way. This allows substantially longer dwelling times between the introduction of the gel and hardening to be defined, which may increase the flexibility in the manufacturing process. In addition, the workpiece composite according to the present invention also provides protection against gel overflow via mechanical introduction during handling, for example, due to vibrations, shocks, or tipping. Introducing gel into the recess in the preform also offers the advantage that the sensor cannot be damaged by icing. The contained gel prevents water from penetrating. Deposits directly on the diaphragm resulting in a characteristics curve drift are also prevented. In addition, the sensor may be installed in any position, since water is not able to penetrate. Previously, especially in applications in which water might penetrate into the sensor, it was necessary to install the sensor in such a way as to allow penetrating or condensed water to escape. Furthermore, the gel is also used for corrosion protection against basic or acidic media attacking the diaphragm.

DETAILED DESCRIPTION OF THE INVENTION

Figure 1:
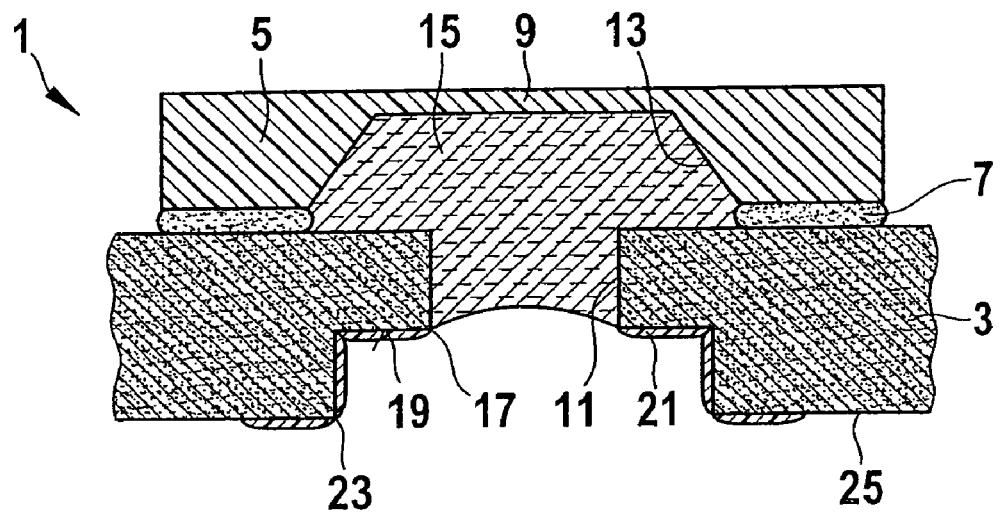
FIG. 1 shows a section through the workpiece composite for a pressure sensor in a first example embodiment of the invention.

As shown in FIG. 1, a workpiece composite 1 for a pressure sensor according to a first example embodiment of the present invention includes a preform 3, which is connected to a pressure sensor chip 5. Pressure sensor chip 5 is attached to preform 3 using an adhesive layer 7 for this purpose.

Preform 3 is a ceramic socket or a PC board, for example. When preform 3 is a ceramic socket, $Al_2O_3$ is suitable as a ceramic, for example. When preform 3 is a PC board substrate, epoxy resin materials are typically used.

Pressure sensor chip 5 is usually a semiconductor chip which has a diaphragm 9. When there is a pressure difference between the pressures acting on the top and bottom sides of diaphragm 9, the diaphragm is deformed. Using the deformation of the diaphragm, the pressure difference, and thus, when a pressure on one side of diaphragm 9 is known, the pressure on the other side of diaphragm 9 may be determined.

For a pressure to be able to act on diaphragm 9 on its side facing preform 3, a recess 11 is formed in preform 3. Recess 11 is designed as a borehole, for example. Due to recess 11, diaphragm 9 is accessible to media also on its side facing preform 3.

In the specific embodiment depicted here, a cavity 13 is formed between preform 3 and diaphragm 9. However, it is also possible as an alternative that the diaphragm lies directly on preform 3.

To protect diaphragm 9, for example, against deposits on diaphragm 9 or condensing water, which may freeze, for example, and even at temperatures below the freezing point of water may permanently damage diaphragm 9, recess 11 and cavity 13 are filled with a gel 15. The side of diaphragm 9 facing preform 3 is completely covered by gel 15. Gel 15 is a passivating gel which, in addition to preventing deposits, also provides corrosion protection against basic or acidic aggressive media. Gel 15 generally contains silicones, partially fluorinated silicones, or perfluoropolyethers. In addition, corrosion protective additives are preferably also contained in the gel.

When selecting a suitable gel 15, particular attention must be paid to the fact that, on the one hand, it performs a protective function for diaphragm 9 but, on the other hand, the diaphragm function, i.e., the sensor characteristics and/or the electronic circuit is/are not to be negatively affected.

Recess 11 and cavity 13 are covered with the gel, for example, as described in German patent document DE-A 10 2005 056 769. For this purpose, the gel is introduced using a soft plastic needle which is inserted through recess 11, for example. By using a soft plastic, it is ensured that the walls of recess 11 or diaphragm 9 are not damaged. A ring is conveniently used as a stop, so that the plastic needle cannot hit diaphragm 9, damaging it. A metal ring, for example, is suitable as a ring. It preferably has a diameter that is greater than the diameter of recess 11.

As an alternative, it is also possible, for example, to introduce gel 15 into recess 11 and cavity 13 by a vacuum dispensing method. Any other suitable methods known to those skilled in the art may also be used to add the gel.

To prevent gel 15 from creeping from recess 11 along preform 3, recess 11 is enclosed by a first edge 17, which acts as a gel stop edge. A surface 19 adjacent to first edge 17 is coated with an oleophobic coating 21 as a further protection against the creeping of gel 15. Oleophobic coating 21 preferably contains a compound selected from the group composed of fluoropolymers, fluorormocers, polymeric fluorocarbon resins, fluorine-containing silanes, and partially fluorinated polymers. Polytetrafluoroethylene (PTFE) or perfluoroalkyl-silanes are suitable compounds, for example.

The coating may be applied, for example, from the liquid phase or from the gaseous phase. Methods for applying coating 21 from the liquid phase include, for example, pad printing, stamping, dripping, dispensing, immersing, or spraying. Suitable methods for applying oleophobic coating 21 from the gaseous phase include, for example, CVD methods or PVD methods, but preferably CVD methods.

In the specific embodiment illustrated here, there is a second edge 23 next to first edge 17. Second edge 23 is also used as a gel stop edge and prevents creeping, for example, when gel flows out of recess 11 or cavity 13, for example, due to tipping or jarring, and reaches the area of surface 19. Both surfaces forming second edge 23 are provided with oleophobic coating 21. Bottom 25 of preform 3, adjacent to second edge 23, is provided with coating 21 only in the area adjacent to edge 23.

Another advantage of second edge 23 is that, for example, roughness may occur in the area of first edge 17, or portions of edge 17 may break off. In this case, creeping of gel 15 occurs in the area of the damage to first edge 17, which may be further limited by second edge 23, in addition to oleophobic coating 21.

Figure 2:
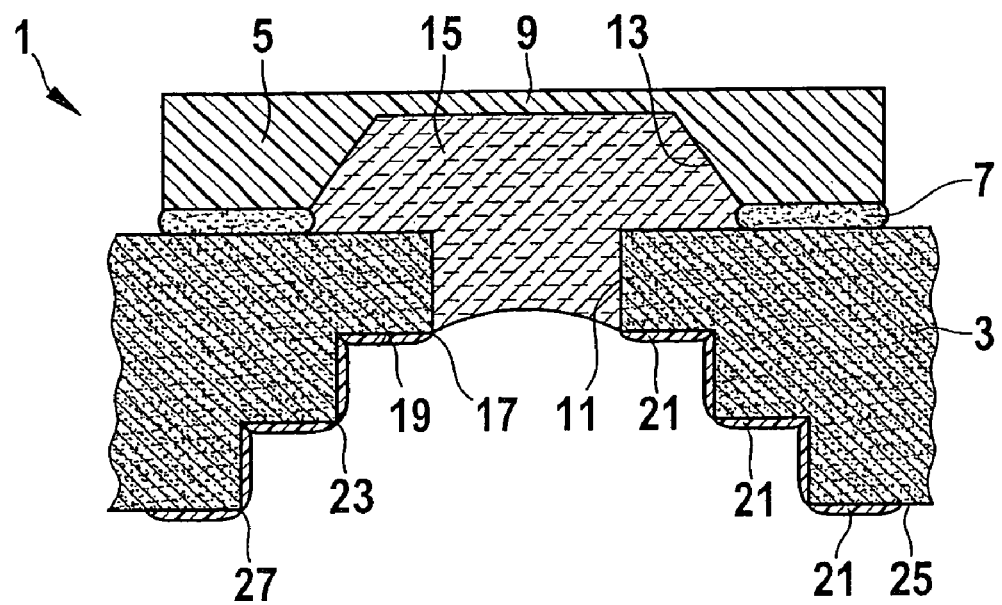
FIG. 2 shows a section through the workpiece composite for a pressure sensor in a second example embodiment of the invention.

A workpiece composite 1 in a second specific embodiment is illustrated in FIG. 2.

Workpiece composite 1 illustrated in FIG. 2 differs from the one illustrated in FIG. 1 by the fact that a third edge 27, which also acts as a gel stop edge, is situated next to second edge 23. First edge 17, second edge 23, and third edge 27 have a stepped design. An additional creep protection is ensured by third edge 27, in particular with regard to jarring or tipping of workpiece composite 1.

Also in the case of third edge 27, as in the case of second edge 23, both adjacent surfaces are provided with oleophobic coating 21. Also in FIG. 2, in the area of bottom 25 of preform 3 only the area adjacent to third edge 27 is coated with oleophobic coating 21. After oleophobic coating 21 has been applied, it is possible that exposed surfaces, for example, bottom 25 of preform 3, the top of preform 3 or exposed surfaces of pressure sensor chip 5 are structured. Structuring may be performed, for example, using UV light, laser, or a plasma method. When coating is removed using a plasma method, the areas containing oleophobic coating 21 preferably remain covered. A loosely placed screen may be used for covering, for example. A PC-board structure, for example, may be applied to preform 3 using structuring.

Figure 3:
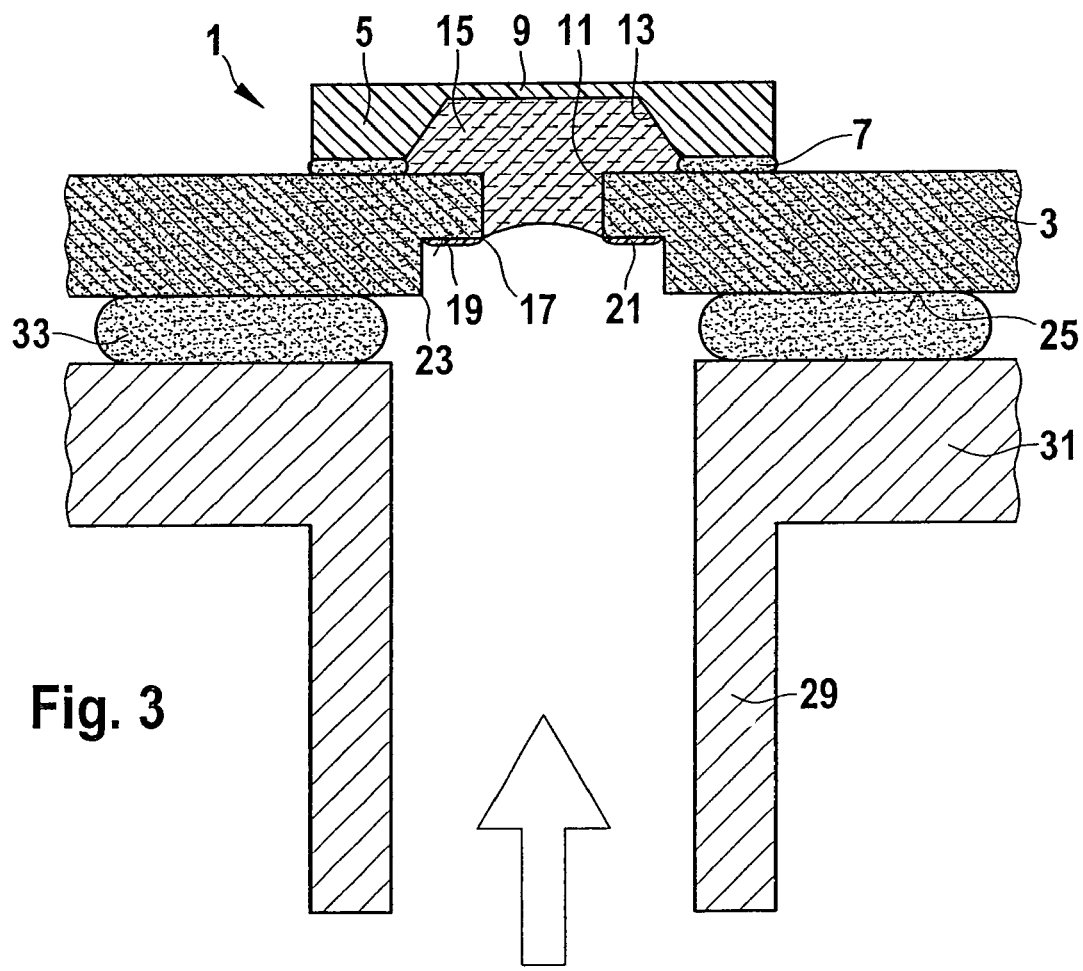
FIG. 3 shows a pressure sensor according to FIG. 1, which is mounted on a connection piece.

FIG. 3 shows a pressure sensor, which is mounted on a connection piece.

The pressure sensor illustrated in FIG. 3 differs from the pressure sensor illustrated in FIG. 1 by the fact that only surface 19 adjacent to first edge 17 is provided with oleophobic coating 21. The surfaces adjacent to second edge 23 have no oleophobic coating.

Workpiece composite 1 containing pressure sensor chip 5 is mounted on a connection piece 29. Connection piece 29 is installed, for example, on a housing containing a gas or a liquid. Such a housing may be a gas or liquid tank, for example. Workpiece composite 1 is mounted on connection piece 29 as a cover. A flange 31, for example, is formed on connection piece 29 for this purpose. Workpiece composite 1 is attached to preform 3 via flange 31. It may be attached using an adhesive, for example. For this purpose, an adhesive layer 33 is applied between flange 31 and bottom 25 of preform 3. Alternatively, however, a detachable connection of workpiece composite 1 with connection piece 29 is also possible. For this purpose, workpiece composite 1 and connection piece 29 may be screwed together, for example. Clamping is also conceivable. In the case of a detachable, connection, a sealing element is preferably introduced between flange 31 of connection piece 29 and bottom 25 of preform 3 to prevent the medium, i.e., the liquid or gas contained, from flowing out from the housing or the piping on which connection piece 29 is mounted. Alternatively, gases or liquids from the environment are also prevented from penetrating into the tank or the piping, for example.

In particular if there is a positive pressure in the tank or the piping and corrosive or poisonous media are possibly contained, it is necessary to achieve a sufficient seal between preform 3 and connection piece 29 to prevent the medium from escaping.

To measure the pressure, the pressure of the medium contained in the tank or the piping acts initially on gel 15 and thus on diaphragm 9 through connection piece 29. This pressure causes diaphragm 9 to deform, the deformation being a function of the pressure difference between the pressure in connection piece 29 and the pressure in the environment. The greater the pressure difference, the greater is the degree of deformation of diaphragm 9. The pressure difference and thus, if the pressure in the environment is known, the pressure in connection piece 29 may be ascertained using the deformation of diaphragm 9.

In addition to the specific embodiments illustrated in FIGS. 1 through 3, it is also possible, for example, to position a glass plate between preform 3 and pressure sensor chip 5. The glass plate has preferably the same peripheral geometry as pressure sensor chip 5. A through opening is formed in the glass plate, which may also be filled with gel 15 with the glass plate installed.

In addition to its use as a pressure sensor, the embodiment according to the present invention having a gel stop edge and oleophobic coating is also suitable for any other workpiece composite in which a gel is used and creeping of the gel is to be prevented. Thus, for example, instead of a pressure sensor chip 5, alternatively other capacitive or other sensor structures may also be used in which diaphragms are applied. Sensor structures of this type include, for example, mass flow rate sensors or microphones (dynamic pressure sensors).

What is claimed is:

1. A workpiece composite, comprising:
 a preform part; and
 a gel accommodated in a recess in the preform part, wherein the recess is enclosed by at least one edge serving as a creep barrier to prevent the gel from spreading, and wherein the at least one edge of the recess defines a termination point of at least one surface at least partially provided with a coating made of an oleophobic material.

2. The workpiece composite as recited in claim 1, wherein two surfaces form the at least one edge, and wherein the two surfaces forming the at least one edge are at least partially provided with the coating made of an oleophobic material.

3. The workpiece composite as recited in claim 2, wherein the oleophobic material of the coating is selected from the group consisting of fluoropolymers, fluorormocers, polymeric fluorocarbon resins, fluorine-containing silanes, and partially fluorinated polymers.

4. The workpiece composite as recited in claim 3, wherein the fluorine-containing silane compound is a perfluoroalkylsilane.

5. The workpiece composite as recited in claim 3, wherein the coating has a layer thickness in the range of 1 nm to 20 μm.

6. The workpiece composite as recited in claim 3, wherein at least two edges are provided in the preform part, and wherein the at least two edges define stepped-configured creep barriers.

7. The workpiece composite as recited in claim 6, wherein all surfaces forming the at least two edges are provided with the oleophobic coating at least in areas adjacent to the at least two edges.

8. The workpiece composite as recited in claim 7, wherein the coating is applied by one of pad printing, stamping, dripping, dispensing, immersion, spraying, CVD methods, or a PVD method.

9. The workpiece composite as recited in claim 7, wherein surface areas of the preform part not provided with the coating are structured to form at least one of a PC board structure and a ceramic socket.

10. The workpiece composite as recited in claim 3, wherein the workpiece composite is configured as a pressure sensor.

11. The workpiece composite as recited in claim 6, wherein the coating is an epilame layer.

12. The workpiece composite as recited in claim 3, wherein the recess enclosed by the at least one edge is sealed by a diaphragm.

13. The workpiece composite as recited in claim 12, wherein the diaphragm is part of a pressure sensor chip.

14. The workpiece composite as recited in claim 12, wherein the preform part is one of a ceramic, a plastic, or a metal.

15. The workpiece composite as recited in claim 12, wherein the gel contains one of silicones, partially fluorinated silicones, or perfluoropolyethers.

16. The workpiece composite as recited in claim 1, wherein at least two edges are provided in the preform part, and wherein the at least two edges define stepped-configured creep barriers.

\* \* \* \* \*